United States Patent [19]

Takahashi et al.

[11] Patent Number: 4,924,044
[45] Date of Patent: May 8, 1990

[54] LIGHT EMITTING PUSH BUTTON SWITCH FOR AN ELECTRONIC APPARATUS

[75] Inventors: Yoshiya Takahashi, Hino; Koichiro Suda, Fuchu; Katumi Itoyama, Hino, all of Japan

[73] Assignee: Kabushiki Kaisha Toshiba, Kanagawa, Japan

[21] Appl. No.: 296,860

[22] Filed: Jan. 13, 1989

Related U.S. Application Data

[63] Continuation of Ser. No. 41,842, Apr. 23, 1987, abandoned.

[30] Foreign Application Priority Data

Apr. 30, 1986 [JP] Japan ............................. 61-69513[U]
Jul. 9, 1986 [JP] Japan ............................ 61-105198[U]

[51] Int. Cl.$^5$ ............................................. H01H 9/00
[52] U.S. Cl. .................................................. 200/314
[58] Field of Search ................................. 200/313, 314

[56] References Cited

U.S. PATENT DOCUMENTS

| | | | |
|---|---|---|---|
| 3,144,643 | 8/1964 | Andersson | 200/314 |
| 3,780,248 | 12/1973 | Martin | 200/313 |
| 4,104,981 | 8/1978 | Ono et al. | 200/314 |
| 4,163,883 | 8/1979 | Boulanger | 200/314 |
| 4,683,359 | 7/1987 | Wojtanek | 200/314 |

*Primary Examiner*—Linda J. Sholl
*Attorney, Agent, or Firm*—Banner, Birch, McKie & Beckett

[57] ABSTRACT

A light emitting push button switch includes a button block moveable in an upward and downward direction responsive to a pushing force applied by an operator to thus alternately change the state of the switch from an ON-state to an OFF-state, a switching detector for detecting movement of the button block and a light source, e.g., a light emitting diode, for illuminating the bottom surface of the button block when the switch is in the ON-state. The button block includes a transparency block and a non-transparency block adhered to the transparency block. At least one portion of the rearwardly facing side of the transparency block gently slopes forward. When the switch is in the ON-state, the light source is activated and emits light which enters the transparency block. As the light enters the block, it is reflected by the rearwardly facing side of the transparency block and is guided to the top surface of the transparency block and radiated therefrom within a wide range. Thus, when an operator observes the top surface of the switch from an oblique angle, the radiated light is clearly visible.

10 Claims, 3 Drawing Sheets

LIGHT EMITTING PUSH BUTTON SWITCH FOR AN ELECTRONIC APPARATUS

This application is a continuation of Ser. No. 041,842, filed April 23, 1987 now abandoned.

TECHNICAL FIELD

The present invention relates generally to a push button switch for an electronic apparatus, such as an electronic telephone, and more particularly, to a light emitting push button switch which is clearly visible within a wide angle.

BACKGROUND OF THE INVENTION

Push button switches which emit light to indicate the switching state, e.g., the ON-state, are well known in the art. FIG. 1 is a cross-sectional view of a light emitting push button switch of the type conventionally known and FIG. 2 is a cross-sectional view of the switch taken along line A—A of FIG. 1.

As shown in the figures, an electronic apparatus comprises a casing 1, a printed circuit board 2 fixedly coupled to casing 1 at side portions thereof (not shown) and an operation panel 5. Operation panel 5 is detachably mounted in casing 1 and an information plate (not shown), such as a paper plate carrying written operational instructions, is positioned between operation panel 5 and casing 1. A push button switch is mounted on the electronic apparatus and comprises a button block 6 positioned in through holes formed in casing 1 and operation panel 5, a switching detector 3 mounted on printed circuit board 2 and supporting button block 6 and a light emitting diode (LED) 4 mounted on printed circuit board 2 adjacent switching detector 3. Button block 6 is movable in an upward and downward direction and includes a flange 9 which contacts the surface of casing 1 to limit the upward movement of the button block.

Switching detector 3 comprises an electrode package 3a, including two electrodes, which is disposed on the surface of printed circuit board 2, and a conical elastic body 3b mounted on electrode package 3a and contacting the bottom surface of button block 6. Conical elastic body 3b is formed of rubber and includes a conductive rubber element (not shown) fixedly disposed at the top interior portion of body 3b. Button block 6 is movable and travels upwardly and downwardly responsive to a downward pushing force applied by an operator and an upward return force of body 3b. In operation, when button block 6 is depressed to turn the switch "on", conical elastic body 3b is defected downwardly so that the two electrodes of package 3a are connected through the conductive rubber element of body 3b and LED 4 is activated to indicate the ON-state.

Button block 6 comprises a non-transparency block 7 and a transparency block 8 adhered to block 7 and formed of a rectangular prism. Non-transparency block 7 is disposed on conical elastic body 3b and transparency block 8 is positioned directly above LED 4.

In a conventional switch such as shown in FIGS. 1 and 2, the ON-state is initiated by pushing down once on button block 6 and the OFF-state is entered by pushing down on the button block a second time. In the ON-state, LED 4 emits light which illuminates the bottom surface of transparency block 8. The emitted light then passes through transparency block 8 and is radiated from the top surface 8c (FIG. 2) of the transparency block 8, as explained hereinafter in greater detail. If the switch is used on a desk apparatus, such as a desk telephone, the operator observes top surface 8c from an oblique angle, which is typically about 45° with respect to the surface of operation panel 5, as shown in FIG. 2.

With continued reference to FIG. 2, light is emitted from LED 4 along light paths K—K' and is refracted on the bottom surface of transparency block 8. The refracted light then enters transparency block 8 along light paths L—L' and is reflected by the inside surfaces of transparency block 8. The reflected light is refracted on top surface 8c and is then emitted from top surface 8c along light paths M—M'. K-L-M and K'-L'-M' thus define the respective paths of light that are visible to the operator. Because the width "O" between light paths M and M' emitted from top surface 8c is narrower than the width "P" corresponding to the width of top surface 8c, it is often difficult for an operator to observe light emitted from top surface 8c if the operator views the switch from a 45° angle. This is particularly true if the surrounding area is brightly lighted. In such circumstances, where the light emitted from top surface 8c is not clearly visible, the operator may incorrectly identify the state of the switch.

SUMMARY OF THE INVENTION

It is a primary object of the present invention to provide a push button switch capable of emitting light within a wide angle.

It is another object of the present invention to provide such a push button switch for use in a desk apparatus where the switch will be usually viewed from an oblique angle.

It is a further object of the present invention to provide a push button switch that can be easily and inexpensively manufactured.

In accordance with the present invention, there is provided a push button switch for an electronic apparatus capable of emitting light within a wide angle so that an operator is able to clearly determine the switching state by observing the illumination of the switch. The push button switch comprises a movable button block for alternately changing the state of the switch from an ON-state to an OFF-state, including a transparency block formed as a prism. At least one portion of the rearwardly facing side of the transparency block gently slopes forward. The switch also comprises a switching detector for detecting movement of the button block and a light source, e.g., an LED, responsive to the switching detector for illuminating the bottom surface of the button block when the switch is in the ON-state. More specifically, when the switch is in the ON-state, the light source is activated and emits light which enters the transparency block. As the light enters the block, it is reflected by the rear side of the transparency block and the light is guided to the top surface of the transparency block. Thereafter, the reflected light passes through the transparency block and is radiated from the top surface of the block within a wide range. Thus, when an operator observes the top surface of the switch from an oblique angle, the radiated light is clearly visible.

BRIEF DESCRIPTION OF THE DRAWINGS

The present invention, together with further objects and advantages thereof, will be best understood by reference to the following detailed description of the invention taken in conjunction with the drawings in which.

DESCRIPTION OF THE PREFERRED EMBODIMENT

Figure 1:
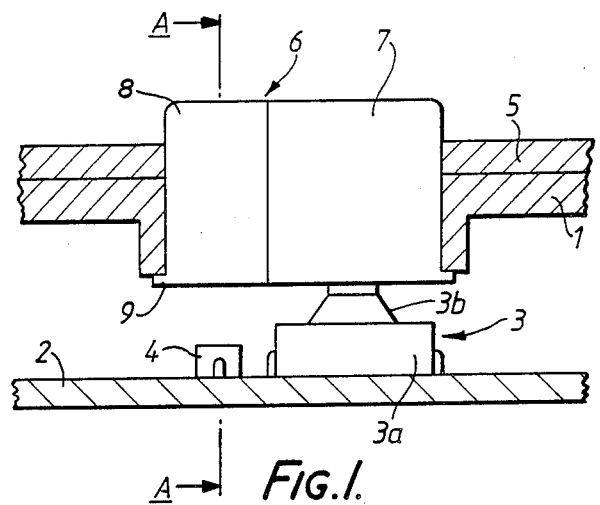
FIG. 1 is a cross-sectional view of a conventional push button switch.
Figure 2:
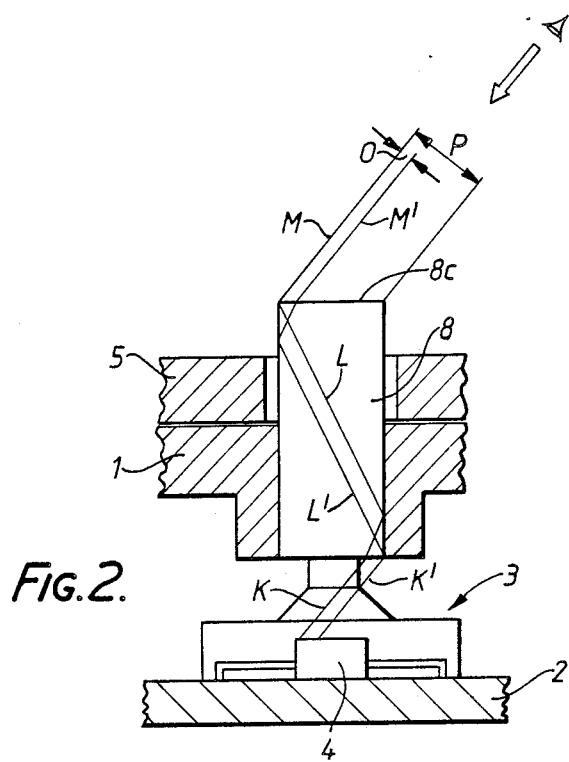
FIG. 2 is a cross-sectional view of the switch taken along line A—A of FIG. 1, particularly illustrating the paths of light which an operator observes from an oblique angle.
Figure 3:
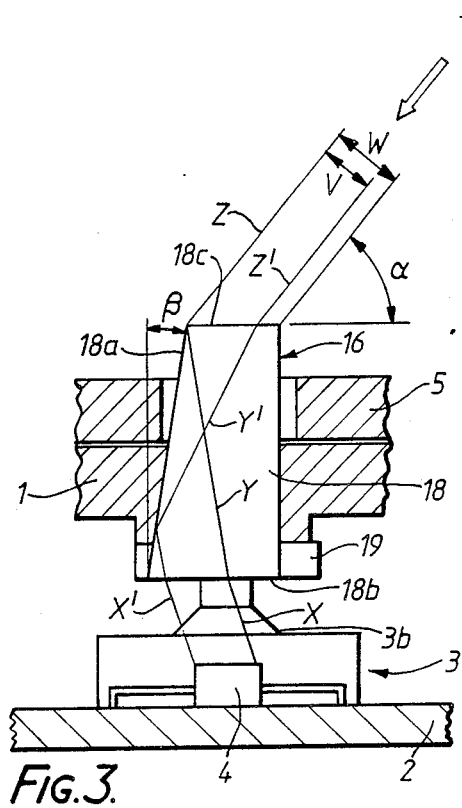
FIG. 3 is a cross-sectional view of a push button switch according to a first embodiment of the invention, particularly illustrating the paths of light which an operator observes from an oblique angle.
Figure 4:
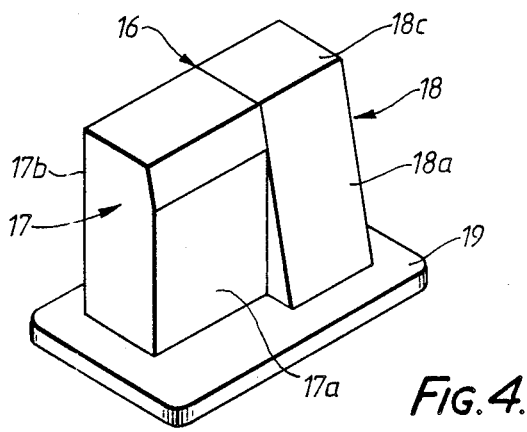
FIG. 4 is a perspective view of the push button block of FIG. 3.

Referring to FIGS. 3 and 4, a first embodiment of the present invention is shown. As shown in the figures, an electronic apparatus includes a casing 1, a printed circuit board 2 fixedly coupled to casing 1 and an operation panel 5 detachably mounted in casing 1. A push button switch is mounted on the electronic apparatus and comprises a switching detector 3 and a light emitting diode (LED) 4 mounted on printed circuit board 2 and a movable push button block 16 positioned in through holes formed in casing 1 and operation panel 5 and adapted to alternately change the state of the switch from an ON-state to an OFF-state. Printed circuit board 2, switching detector 3, LED 4 and operation panel 5 are substantially identical to the numbered items in FIGS. 1 and 2.

Push button block 16 comprises a non-transparency block 17, a transparency block 18 adhered to block 17 by, for example, application of heat and pressure to form a unitary body. A flange 19 is positioned proximate the bottom surfaces of blocks 17 and 18 and contacts the surface of casing 1 to thus limit the upward movement of button block 16. In the preferred embodiment, transparency block 8 is a prism constructed of an acrylic resin having a refractive index with respect to air of 1.49.

Rearwardly facing side 17a and forwardly facing side 17b of non-transparency block 17 are parallel to each other and the top and bottom surfaces of blocks 17 and 18 are also parallel to each other, except that the top portion of rearwardly facing side 17a is slightly sloped forward to facilitate the positioning of button block 16 within the through holes formed in casing 1 and operation panel 5. In addition, the rearwardly facing side 18a of transparency block 18 also gently slopes forward at an oblique angle (FIG. 3), measured with respect to a line perpendicular to the top and bottom surfaces 18c and 18d of transparency block 18, of about 10°.

When an operator operates button block 16 to place the switch in the ON-state, LED 4 emits light which illuminates the bottom surface 18b of transparency block 18. Light emitted from LED 4 passes through transparency block 18 and is radiated from the top surface 18c. If the switch is used on a desk telephone, the operator observes the light from an oblique angle α (FIG. 3), that is usually about 45° with respect to the surface of operation panel 5.

Referring specifically now to FIG. 3, light is emitted from LED 4 along light paths designated X—X' and enters transparency block 18 at the bottom surface 18b. As light enters the transparency block, the light is refracted on bottom surface 18b along light paths Y—Y'. The light is then reflected by rearwardly facing side 18a and the reflected light is refracted on top surface 18c along light paths Z—Z' and emitted from the top surface. X-Y-Z and X'-Y'-Z' thus define the respective paths of light that are visible to the operator.

In FIG. 3, the width "W" represents the width of top surface 18c presented with the operator observes the switch from an oblique angle α. The width "V" between light paths Z and Z$^1$ closely approximates width "W," as shown in FIG. 3. Thus, emitted light is clearly visible to the operator and the likelihood of an erroneous identification by the operator of the switching state is substantially reduced as compared to the prior art switch of FIGS. 1 and 2.

Figure 5:
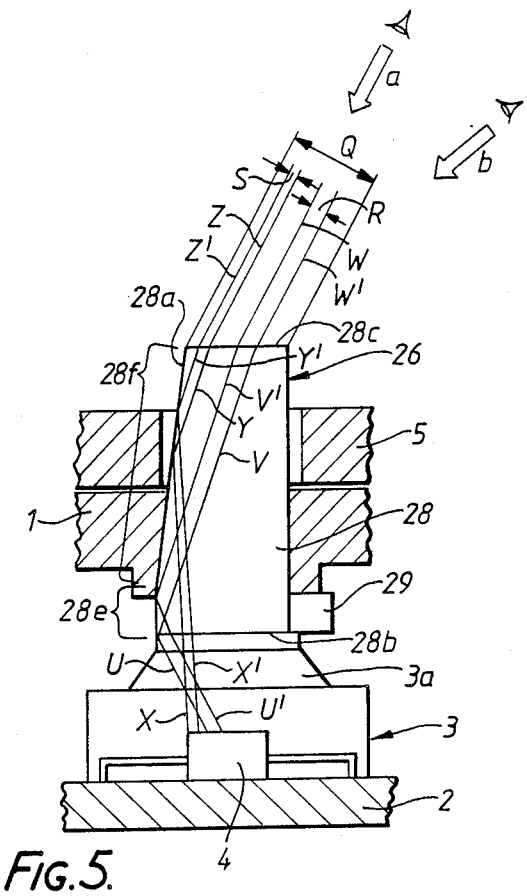
FIG. 5 is a cross-sectional view of the push button switch according to a second embodiment of the present invention, particularly illustrating the paths of light which are visible when an operator observes the switch from above and at an oblique angle.
Figure 6:
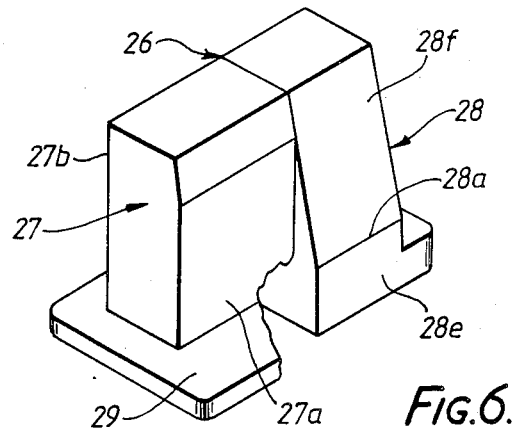
FIG. 6 is a perspective view of the push button block of FIG. 5.

FIGS. 5 and 6 illustrate a second embodiment of the present invention. As shown in the figures, push button block 26 comprises a non-transparency block 27, a transparency block 28 adhered to non-transparency block 27 and a flange 29. Block 27 is substantially identical to block 17 of FIG. 4. The bottom surface 28b and top surface 28c of transparency block 28 are parallel to each other and are perpendicular to the front side 28g of transparency block 28. The rearwardly facing side 28a of transparency block 28 comprises a top portion 28f and a bottom portion 28e. Bottom portion 28e is perpendicular to the bottom surface 28b of transparency block 28 and top portion 28f gently slopes forward at an angle of about 10° with respect to bottom portion 28e.

In operation, LED 4 emits a light which illuminates the bottom surface 28b of transparency block 28 when the switch is in the ON-state. Light then passes through transparency block 28 and is emitted from top surface 28c. If the switch is used on a desk telephone, the operator, designated "b" in FIG. 5, will observe the light from an oblique angle of about 45° with respect to the surface of operation panel 5 when the operator is sitting down. When viewed from this angle, the emitted light visible to the operator will be substantially as described above with respect to FIG. 3. This is because rearwardly facing side 18a and top portion 28f are identically sloped at an angle of about 10 degrees with respect to the horizontal and will thus cause light entering the transparency block to be reflected and presented to the operator within the same range.

If, on the other hand, the operator is standing, he will observe the switch from an oblique angle of about 70° with respect to the surface of operation panel 5. FIG. 5 illustrates the paths of light that are visible to the operator from that position.

Referring to FIG. 5, light emitted from LED 4 enters block 28, along light paths designated X—X' and U—U', at bottom surface 28b and is refracted along light paths Y—Y' and V—V'. The refracted light along paths Y—Y' is then reflected by top portion 28f and the reflected light is refracted on top surface 28c and passes out from the top surface in the direction of the operator along light paths Z—Z'. Refracted light along light paths V—V' is reflected by bottom portion 28e and refracted on top surface 28c so that the refracted light passes out from top surface 28c in the direction of the operator along light paths W—W'.

In FIG. 5, the width "Q" represents the width of top surface 28c which is presented when the operator observes the switch from an oblique angle of 70°. At that angle, light emitted from surface 28c is visible within the width "R" between light paths W and W' and within width "S" between light paths Z and Z'. Because the total width, i.e., R+S, is not narrow as compared to width "Q", the emitted light is clearly visible making it less likely that an operator will mistakenly identify the switching state of the switch.

In the above-described embodiments, rearwardly facing sides 18a and 28a comprise a single sloped surface. However, sides 18a and 28a may alternatively be configured with a plurality of sloped surfaces.

This invention has been described in detail with reference to the preferred embodiments. It will be easily understood by those skilled in the art that modifications can be made therein without departing from the spirit and scope of the invention as defined by the appended claims.

We claim:

1. A light emitting push button switch for an electronic apparatus comprising:
   a button block movable in an upward and downward direction responsive to a pushing force applied by an operator to thus alternately change the state of the switch from a first state to a second state, said button including:
   a transparency block having a top surface and a bottom surface disposed directly opposite and parallel to said top surface, the rearwardly facing side of said transparency block having a first portion of the side perpendicular to the top and bottom surfaces and a second of he side sloped forward from said first portion;
   a non-transparency block adhered to said transparency block; and
   detecting means for detecting movement of said button block; and
   a light source disposed directly opposite and parallel to the bottom surface of said bottom block and responsive to said detecting means for emitting light to illuminate the bottom surface of said transparency block when said switch is in the first state, so that light reflected by the rearwardly facing side of he transparency block is guided to the top surface of the transparency block and is radiated therefrom.

2. A push button according to claim 1 wherein said non-transparency block is disposed on said detecting means and said transparency block is positioned directly above said light source.

3. A push button switch according to claim 1 wherein said button block is positioned within a through hole formed in the electronic apparatus.

4. A push button switch according to claim 1 wherein said light source is a light emitting diode.

5. A push button switch according to claim 1 wherein the rearwardly facing side of said transparency block comprises a plurality of sloped surfaces.

6. A light emitting push button switch for an electronic apparatus comprising:
   a button block movable in an upward and downward direction responsive to a pushing force applied by an operator to thus alternately change the state of the switch from a first state to a second state, said button block including:
   a transparency block having a top surface and a bottom surface disposed directly opposite and parallel to said top surface, the rearwardly facing side of the transparency block comprising a first portion located proximate the bottom of said rearwardly facing side disposed perpendicular to the top surface of said transparency block and a second portion located proximate the top of the rearwardly facing side, said second portion being gently sloped forward with respect to said first portion;
   detecting means for detecting movement of said bottom block; and
   a light source disposed directly opposite and parallel to the bottom surface of said button block and responsive to said detecting means for emitting light to illuminate the bottom surface of said transparency block when said switch is in the first state, so that light reflected by the rearwardly facing side of the transparency block is guided to the top surface of the transparency block and radiated therefrom.

7. A push button switch according to claim 6 wherein said non-transparency block is disposed on said detecting means and said transparency block is positioned directly above said light source.

8. A push button switch according to claim 6 wherein said button block is positioned within a through hole formed in said electronic apparatus.

9. A push button switch according to claim 6 wherein said light source is a light emitting diode.

10. A push button switch according to claim 6 wherein the second portion of said rearwardly facing side comprises a plurality of sloped surfaces.

* * * * *